(12) United States Patent
Finger et al.

(10) Patent No.: US 11,648,725 B2
(45) Date of Patent: May 16, 2023

(54) METHOD AND APPARATUS FOR HEATING PLASTIC PREFORMS

(71) Applicant: KRONES AG, Neutraubling (DE)

(72) Inventors: Dieter Finger, Neutraubling (DE); Thomas Kitzinger, Regensburg (DE)

(73) Assignee: KRONES AG, Neutraubling (DE)

( * ) Notice: Subject to any disclaimer, the term of this patent is extended or adjusted under 35 U.S.C. 154(b) by 428 days.

(21) Appl. No.: 16/638,365

(22) PCT Filed: Aug. 24, 2018

(86) PCT No.: PCT/EP2018/072926
§ 371 (c)(1),
(2) Date: Feb. 11, 2020

(87) PCT Pub. No.: WO2019/038441
PCT Pub. Date: Feb. 28, 2019

(65) Prior Publication Data
US 2020/0307064 A1    Oct. 1, 2020

(30) Foreign Application Priority Data

Aug. 25, 2017  (DE) .................... 10 2017 119 492.4

(51) Int. Cl.
*B29C 49/64*  (2006.01)
*B29C 49/68*  (2006.01)
*B29C 49/78*  (2006.01)

(52) U.S. Cl.
CPC ...... *B29C 49/6445* (2013.01); *B29C 49/6454* (2013.01); *B29C 49/6472* (2013.01);
(Continued)

(58) Field of Classification Search
CPC ... B29C 49/68; B29C 49/786; B29C 49/6454; B29C 49/6472; B29C 49/6445;
(Continued)

(56) References Cited

U.S. PATENT DOCUMENTS

| 2005/0146065 A1 | 7/2005 | Cochran |
| 2011/0294086 A1 | 12/2011 | Klaus |
| 2013/0011807 A1 | 1/2013 | Winzinger et al. |

FOREIGN PATENT DOCUMENTS

| CA | 2 510 702 A1 | 8/2004 |
| CN | 102310555 A | 1/2012 |

(Continued)

OTHER PUBLICATIONS

International Search Report dated Nov. 27, 2018 for PCT/EP2018/072926.
(Continued)

*Primary Examiner* — Monica A Huson
(74) *Attorney, Agent, or Firm* — Schmeiser, Olsen & Watts, LLP

(57) ABSTRACT

Provided is a method for heating plastic preforms, wherein the plastic parison are transported along a predetermined transport path and are heated during this transport, wherein at least one first heating section with at least one first heating element as well as at least one second heating section with at least one second heating element is arranged along the transport path, by a first temperature measuring device an actual temperature of the plastic preforms is measured in or before a start region of the transport path, and as a function of this actual temperature of the plastic preforms the at least one first heating element is controlled in such a way that the plastic preforms reach a predetermined target temperature after heating by this at least one first heating element.

5 Claims, 1 Drawing Sheet

(52) U.S. Cl.
CPC ............ *B29C 49/68* (2013.01); *B29C 49/786* (2013.01); *B29C 49/78* (2013.01)

(58) Field of Classification Search
CPC ................ B29C 49/6418; B29C 49/06; B29C 2949/78663; B29C 2949/78151
See application file for complete search history.

(56) References Cited

FOREIGN PATENT DOCUMENTS

| | | | |
|---|---|---|---|
| CN | 102725123 | A | 6/2014 |
| CN | 103802302 | A | 6/2014 |
| CN | 103862660 | A | 6/2014 |
| CN | 106166832 | A | 11/2016 |
| CN | 106166833 | A | 11/2016 |
| CN | 106457653 | A | 2/2017 |
| CN | 113544606 | A | 10/2021 |
| DE | 60305993 | T2 | 10/2006 |
| JP | S6034827 | A | 2/1985 |
| JP | H11348106 | A | 12/1999 |

OTHER PUBLICATIONS

Database WPI Week 200010 Thomson Scientific, London, GB; AN 2888-118643 XP802786600.

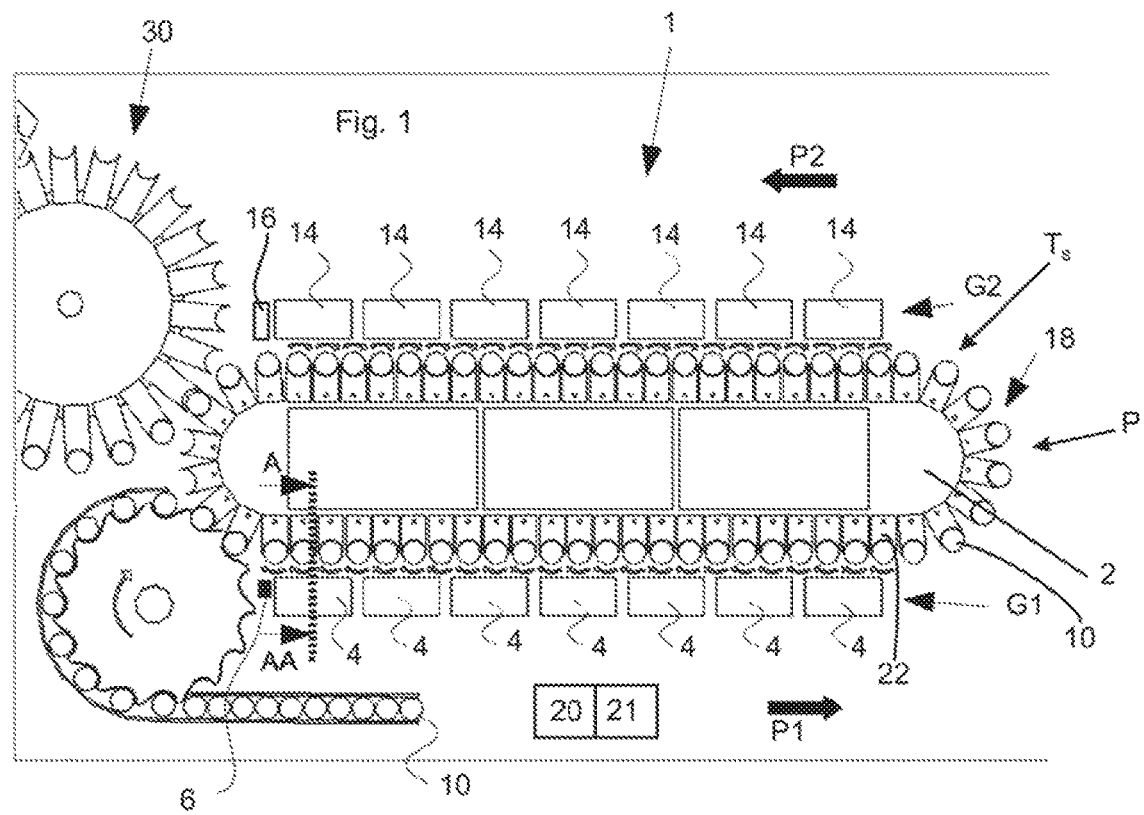

METHOD AND APPARATUS FOR HEATING PLASTIC PREFORMS

CROSS-REFERENCE TO RELATED APPLICATIONS

This application claims priority to PCT Application No. PCT/EP2018/072926, having a filing date of Aug. 24, 2018, based on German Application No. 10 2017 119 492.4, having a filing date of Aug. 25, 2017, the entire contents both of which are hereby incorporated by reference.

FIELD OF TECHNOLOGY

The following relates to a method and apparatus for heating plastic preforms. It has been known for a long time from conventional art that plastic preforms are heated in an oven and then are transformed into containers in a transforming device such as for example a so-called stretch blow moulding machine. Corresponding heating devices or ovens usually have a specific number of heating elements such as for example heater boxes which are arranged one behind the other in the running direction of the plastic preforms. In some instances, a temperature measuring device such as for example a pyrometer for contactless measurement of the temperature of the plastic preforms is arranged at the outlet of this heating device or of the oven. This measurement serves on the one hand in order to pass on only high-quality bottles to the following machine, such as for instance a stretch blow moulding machine. Furthermore, this temperature can serve in order to readjust manipulated variables for the heating power and thus to keep the temperature of the plastic preforms stable in the process.

BACKGROUND

The transit time through this oven is approximately 20 seconds. This results in a dead time. Due to this dead time, it is only possible to start to adjust disturbance variables at the earliest after 20 seconds. The quality of the containers still cannot be guaranteed during this time. In the worst case they would have to be discharged. Especially at the starting of production, assumptions must be expected, that is to say a specific preform temperature is assumed. In practice, however, the actual temperature is far from this assumed temperature, and then the heating device or the oven requires a very long time until the process is optimal adjusted. In this case disturbance variables are for example different temperatures of the plastic preforms, which are brought about in particular by inconsistent storage of the containers. In addition, different temperatures are also produced by a lack of preliminary temperature control in the building.

SUMMARY

An aspect relates to faster temperature control or also, in the case of readjustment, shorter downtimes.

In a method according to embodiments of the invention for heating plastic preforms, the plastic preforms are transported along a predetermined transport path and are heated during this transport. In this case at least one first heating section with at least one first heating element and preferably several first heating elements as well as a second heating section with at least one second heating element and preferably several second heating elements are arranged along the transport path.

According to embodiments of the invention by a first temperature measuring device an actual temperature of the plastic preforms is measured before or in a start region of the transport path and as a function of this actual temperature of the plastic preforms at least the first heating element or one of the first heating elements (generally at least one heating element of the first heating section) and/or at least the first heating elements are controlled in such a way that the plastic preforms have a predetermined target temperature after heating by this first heating element or these first heating elements.

The temperature is preferably measured before the actual heating is started, that is to say in particular before the relevant plastic preform reaches the first heating element or a group of first heating elements. However, it would also be conceivable to measure the temperature after the plastic preform has already passed a specific number of heating elements.

In particular the start region is a first half of the entire transport path of the plastic preforms, preferably a first third of the entire transport path of the plastic preforms, preferably a first quarter of the entire transport path of the plastic preforms, particularly preferably a first eighth of the entire transport path of the plastic preforms.

In this case the transport path is preferably divided into transport sections and in particular into a first and a second heating section. The first and second heating section here contain at least one first and one second heating element and preferably first and second heating elements. The first heating section therefore serves in particular in order to apply a specific uniform target temperature to all plastic preforms. The actual required heating is achieved in the second transport or heating section. In this case the transport section, in which the target temperature is reached, and the transport section, in which the profiling takes place, can also have different lengths. The section in which the target temperature is achieved is preferably shorter than the section in which the profiling or the individual heating takes place.

In a preferred method the plastic preforms are transformed after being heated and in particular are transformed to form plastic containers such as plastic bottles and in particular blow moulded. In this case, however, this transforming can take place in particular with blowing air, but transforming by a liquid product and in particular by the beverage to be introduced would also be conceivable.

Thus, the transport path of the plastic preforms preferably also has two sections. In particular, the heating device is an infrared oven, that is to say the individual heating elements are preferably infrared heating elements. Particularly preferably, the heating device has a plurality of first and second heating elements (wherein, as mentioned above, the first heating elements are preferably arranged in the first heating section and the second heating elements are arranged in the second heating section). Furthermore, it is also possible that the plastic preforms are rotated during their heating and in particular are rotated about their own longitudinal axis or longitudinal direction. In addition to an infrared oven, however, it would also be conceivable that the heating takes place by means of microwaves, that is to say in particular by a microwave oven.

In this case the heating device could have a stationary activator and/or resonator, by which the plastic preforms are transported.

In a further preferred method at least two target value settings are predetermined. In this case it is conceivable that the first target value setting (in particular a target temperature) is predetermined after the end of the temperature equalisation. In this case this first target value setting can be predetermined for example in the region of a deflection of the plastic preforms, but it would also be possible that the first target value setting is predetermined in a region of the first heating section, for example in a region of the first heating elements. Thus, this first target value setting can take place in a region of the heating elements on the front face of the oven, for example in the centre of the first heating section (which is formed here by the front face of the oven).

Thus, embodiments of the invention propose that the actual temperature of the plastic preforms is already measured at or before the inlet (or the start region) of the heating device. A control device can then preferably determine a difference between the actual temperature of the plastic preforms and the assumed temperature at the inlet of the oven and in this way can then calculate the energy which is required in order to bring the plastic preforms to a defined starting level (in particular at the end of the first heating section). Then the at least one first heating element and preferably several first heating elements are used in order to produce this starting level. In this way, uniform starting conditions can be assumed in the profiling. In this case it is preferably conceivable that in the case of the first heating element a manipulated variable is controlled so that primarily the determined energy is introduced:

$$E=c*m*\Delta\vartheta$$

In this case c is the specific thermal capacity, m is the mass and $\Delta\vartheta$ is the temperature difference between a target value and an actual value of the temperature of the plastic preforms.

Furthermore, the introduced energy can be calculated as follows:

$$E=P*t*\eta_{ofen}*\alpha$$

In this case P designates the heating power of the at least first heating element, t designates the residence time before the first heating elements, $\eta_{ofen}$ designates the effectiveness of the oven and a designates the degree of absorption of the plastic parison.

Specific material constants and type parameters which are specific for the plastic preforms are the specific thermal capacity, the mass and the degree of absorption of the plastic parison. These three values can be combined into a joint type-dependent material constant:

$$k_{Mat}=c*m/\alpha=P*t*\eta_{ofen}*\Delta\vartheta^{-1}$$

This equation is obtained from the above-mentioned equations.

The material constant of the plastic preforms is preferably determined by a further method. For this purpose, a plastic preform is preferably supplied with a defined heating power over a specific residence time in the oven and the plastic preform temperature at the oven inlet and oven outlet is measured. In this case the plastic preform preferably stops at the outlet of the oven before a temperature measuring device and in particular directly before a temperature measuring device such as in particular, but not exclusively, a pyrometer. Then by means of the temperature gradients conclusions can be drawn as to the thickness of the plastic preforms. In addition, for a precise determination of the material constants a certain equalisation time is preferably provided, so that not only is the surface temperature is determined, which tends to be higher and in particular would falsify the measurement result.

The material constant is preferably implemented in each case when setting up a new procedure or a new recipe. In this case it is preferably possible that this determination of the material constant can be initiated or started in particular via a menu by an operator.

This determined material constant is preferably used for a temperature compensation, by determination of the heating power of the first heating element and/or the residence time. In this case it is possible that this residence time is determined by means of the following relation:

$$P*t=k_{Mat}*\Delta\theta/\eta_{ofen}$$

In this case it is preferably possible that for the penetration of the energy the heating power and the residence time are in each case varied to the disadvantage of the other value. A short residence time leads to a high heating power and potentially to strong temperature gradients over the thickness of the preform. A lower heating power leads to the conclusion that for the preliminary temperature control of the plastic preforms more heating elements are required and therefore heating elements for the actual profiling are then lost.

In a preferred method the plastic preforms are first of all heated by the one first heating element and then by the at least one second heating element.

The heating elements are preferably arranged stationary and the plastic preforms are transported past these heating elements. The heating of the plastic preforms takes place during this transport. However, it would also be possible the plastic preforms are also transported with the heating elements. Thus, the heating element could for example be pre-tempered in a first group of heating elements and then be profiled in a second group of heating elements.

In a further preferred method, a second actual temperature of the plastic preforms is measured by means of a second temperature measurement and the second heating element is preferably controlled as a function of this second actual temperature of the plastic preforms. Thus, for example a temperature of the plastic preforms can be determined at the outlet or after the outlet of the oven and the profiling by the second heating element can be set as a function of this starting temperature.

As mentioned above, a material constant of the plastic preforms is preferably determined. This takes place particularly preferably in the manner specified above, wherein in this determination of the material constant at least one parameter from a group of parameters, which contains a mass of the plastic preforms, an absorption coefficient of the plastic preforms and/or a specific thermal capacity of the plastic preforms, is preferably taken into consideration.

This material constant is particularly preferably taken into consideration during the heating of the plastic preforms.

In a further preferred method, a length of the plastic preforms is also determined. This length can be determined for example with the aid of a subsequent stretch blow moulding machine. In this case it is assumed that the plastic preforms have a uniform length. The preform length is a further parameter which is dependent upon the plastic preforms. As mentioned, this parameter can be determined jointly with other material constants, for instance by moving a plastic preform into a blow moulding station or stretch blow moulding machine. In this case it is possible that a stretching rod, which in normal operation serves for expanding the plastic preforms, moves downwards with reduced force until the stretching rod is stopped by the base of the plastic preform. The length of the plastic preform can be determined from this actual position. The parameter could also serve as a preset for a position of bottom heating elements, such as for example movable bottom tiles. In this case an operator no longer has to determine these parameters himself.

In addition, the length of the plastic preforms can also serve to deactivate those regions of the heating elements which have no influence on the plastic preforms and for example would even radiate below bottom tiles. Overall, with the proposed method temperature fluctuations can be equalised and the quality of the containers can be increased.

Furthermore, embodiments of the present invention are directed to an apparatus for heating plastic preforms which has a transport device which transports the plastic preforms along a predetermined transport path, wherein this transport device has a plurality of holding elements for holding the plastic preforms. Furthermore, the apparatus has at least one first heating element which is arranged along this transport path and at least one second heating element which is arranged along this transport path downstream of the first heating element.

According to embodiments of the invention the apparatus has a first temperature measuring device, which measures an actual temperature of the plastic preforms before or at the beginning of the transport path, as well as a control device, which controls at least the first heating element as a function of a temperature of the plastic preforms measured by the temperature measuring device. The apparatus particularly preferably has a plurality of first heating elements and/or a plurality of second heating elements. The apparatus particularly preferably has a plurality of first and a plurality of second heating elements. Particularly preferably these heating elements are controllable individually. In a further preferred embodiment, the apparatus has a calculation unit which, taking the plastic preform temperature into consideration, calculates the energy necessary in order to heat the plastic preforms to a specific target temperature.

In this case these heating elements are preferably arranged one behind the other along the transport path of the plastic preforms. These heating elements are preferably arranged one behind the other along a straight section of the transport path of the plastic preforms. In this case these individual heating elements can preferably have one or more infrared radiators which particularly preferably are arranged in a vertical direction one above the other. In this case it is also possible that individual ones of these infrared radiators are switched off or switched on as a function of a length of the plastic preforms.

The transport device for transporting the plastic preforms preferably has a circulating transport means, such as in particular a transport chain, on which a plurality of holding elements for holding the plastic preforms are arranged. In addition, a support wheel could also be provided on which the individual holding elements are arranged.

The holding elements preferably have internal gripping devices which are suitable for engaging in the mouths of the individual plastic preforms in order to hold them.

Particularly preferably the apparatus has a rotating device in order to rotate the plastic preforms with respect to their longitudinal axis. In this case a rotation of these plastic preforms particularly preferably takes place during the transport of the plastic preforms through the heating device.

In an advantageous embodiment the apparatus has a second temperature measuring device, which measures an actual temperature of the plastic preforms in particular at or after an end of the transport path, and preferably also a control device, which controls at least the second heating element or the heating elements arranged in the first heating section as a function of a temperature of the plastic preforms measured by the second temperature measuring device.

In this case it is also possible that this second temperature measuring device serves during operation for controlling and in particular for regulating the part of the oven which is responsible for the profiling. Moreover, this second temperature measuring device can also serve so that, in particular during a calibration run with individual preforms (and preferably also in interaction with the first temperature measuring device) the material constant thereof is determined.

Thus, this second temperature measuring device serves in particular for profiling of the plastic preforms or reaching a required actual temperature, before they are transferred to a subsequent machine component, such as a stretch blow moulding machine. In particular, this second temperature measuring device can also be used in order to perform a calibration of the apparatus, that is to say in particular in order to determine a temperature difference $\Delta\vartheta$ which in turn can serve in order to determine the material constant of the plastic preforms.

In a further preferred embodiment at least one heating element and preferably several heating elements in each case have a plurality of radiating units or heating units, which particularly preferably are arranged one above the other in a longitudinal direction of the plastic preforms to be heated. These heating units can preferably be controlled independently of one another. In this way it is possible to supply or to heat the plastic preforms along their longitudinal direction with a changing temperature profile. These radiating units preferably extend along the transport path of the plastic preforms.

In other words, at least one first heating element and/or at least one second heating element forms a plurality of heating zones which are arranged one above the other in a longitudinal direction of the plastic preforms. Preferably in this case at least one heating element and preferably several heating elements forms/form at least three such heating zones, preferably at least 4 such heating zones, preferably at least 5 such heating zones and particularly preferably at least 6 such heating zones.

Thus, it would be possible, for example, that specific heating zones of an individual heating element are activated, and others are deactivated. These different heating zones can also be operated with different powers.

In a preferred embodiment the temperature measuring device makes possible a temperature measurement of the plastic preforms also as a function of the longitudinal direction thereof. Thus, it is possible that the temperature of the plastic preforms is also determined as a function of a position of the plastic preforms in the longitudinal direction thereof. Thus, it would be possible that the temperature measuring device has several sensor elements which are arranged one above the other or one above the other in a longitudinal direction of the plastic preforms to be heated. In this way a temperature determination of the plastic preforms is also possible as a function of a vertical position of the plastic preforms.

BRIEF DESCRIPTION

Some of the embodiments will be described in detail, with reference to the following figures, wherein like designations denote like members, wherein:

FIG. 1 shows a schematic representation of an apparatus according to embodiments of the invention; and FIG. 2 shows a representation of a method according to embodiments of the invention.

DETAILED DESCRIPTION

FIG. 1 shows an apparatus 1 according to embodiments of the invention for heating plastic preforms 10. This apparatus 1 has a transport device 2 which has a plurality of holding elements 22 for holding the plastic preforms 10. This transport device is designed here as a transport chain circulating in an oval configuration. The references 4 relate to a plurality of first heating elements (which are preferably components of a first heating section), such as heater boxes, and the references 14 relate to a plurality of second heating elements (which are components of a second heating section) or heater boxes. Correspondingly the reference G1 designates the first warming section (that is to say den first heating section) and the reference G2 designates the second warming section (that is to say the second heating section).

The reference P designates the entire transport path of the plastic preforms which can be divided into a first path section P1 and a second path section P2. During the transport along the first transport section P1 the plastic preforms are heated by the heating elements 4 and during the transport P2 the plastic preforms are heated by the heating elements 14. A longitudinal direction (not shown) of the plastic preforms extends perpendicular here to the drawing plane, that is to say the plastic preforms are transported in a vertical orientation with their mouths upwards. However, transport of the plastic preforms with their mouths downwards would also be conceivable.

The reference 6 designates a first temperature measuring device, such as a pyrometer, which contactlessly detects the temperature, more precisely the actual temperature $T_I$ of the plastic preforms at the start of heating, that is to say here in particular before they are heated by the first heating element 4. The reference sign 20 identifies a control device which serves to control the first heating elements 4. In this case, as mentioned above, the heating elements 4 are controlled using the preform temperature or temperature of the plastic preforms determined by the temperature measuring device 6. The reference $T_S$ designates the target temperature which the plastic preforms should reach after passing through the first path section.

In addition, a processor device 22 is also provided which, starting from the actual temperature of the plastic preforms and taking the target temperature of the plastic preforms into consideration, calculates a heating power which is required in order to reach this target temperature. The control device is preferably also suitable and intended to take a transport speed of the plastic preforms into consideration in the determination of the heating power.

This control device 20 or optionally also a further control device is suitable and intended to control the individual heating elements 4. In this case this control can take place in such a way that the plastic preforms reach the required target temperature at the outlet of the heating device.

The reference 18 designates a deflection region in which the plastic preforms are transferred from the first transport section P1 into the second transport section P2. No heating of the plastic preforms takes place in this region. The reference 30 designates a transport device which transports the already heated plastic preforms to a further plant such as in particular a stretch blow moulding machine (not shown) (of which the oven is a component).

The reference 16 designates a further temperature measuring device which is arranged at the end of the transport path and thus determines the starting temperature of the plastic preforms. Thus, it is possible to determine a temperature difference of the plastic preforms between the inlet and the outlet of the oven and thus in particular to calculate the material constants, as mentioned above.

Thus, the plastic preforms can be brought to a uniform temperature along the first transport section P1, and an individual profiling of the individual temperatures of the plastic preforms takes place in the second transport section P2. In this case it is also possible that this profiling already takes place in the first heating section, in particular individually in an end region of this first heating section.

FIG. 2 shows a further representation of a method according to embodiments of the invention. It will be recognised here that the warming device has a plurality of heating elements or heater boxes, in the example a total of 43 heating elements, which are arranged one behind the other along the transport path of the plastic parisons, and past which the individual plastic preforms are transported.

In this case each of these individual heating elements has a plurality of heating zones which are arranged one above the other in the longitudinal direction of the plastic preforms. In this case these heating zones can be formed by heat radiators which are arranged one above the other in the longitudinal direction of the plastic preforms. It will be recognised here that the heating zones 6-9 or the heat radiators of these zones are deactivated in each case. In particular in this setting shorter plastic preforms should be heated, which do not extend into the region of the heating zones 6-9.

In the remaining heating zones, the respective heating elements or heater boxes are partly activated and partly not activated. It will be recognised for example that in the fourth heating zone several of the heating elements are not activated. This means that the plastic preforms in a vertical position which corresponds to this heating zone are heated less than in another vertical position. In this way a changing temperature profile can also be applied in the longitudinal direction of the plastic preforms.

Thus, in the example illustrated in FIG. 2 the central regions in the longitudinal direction of the plastic preforms are heated less strongly than the lower and upper regions.

Furthermore, it will be recognised that in the illustrated example a profiling of the heating profile occurs from the heating elements 9+10. Thus in the start region that is to say here in the region of the heating elements 1-8 the plastic preforms are heated uniformly, wherein here in the heating zones 1-5 in each case the heating elements 1-4 are activated and the heating elements 5-8 are deactivated.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF REFERENCES 1 apparatus according to the invention
2 transport device
4 first heating elements or heater boxes
6 first temperature measuring device
10 plastic preforms 14 second heating elements or heater boxes
16 further temperature measuring device
18 deflection region
20 control device
22 holding elements
30 transport device
G1 first warming section, first heating section
G2 second warming section, second heating section
P transport path
P1 first path section
P2 second path section
$T_I$ actual temperature
$T_S$ target temperature

The invention claimed is:

1. A method for heating plastic preforms, wherein the plastic preforms are transported along a predetermined transport path and are heated during this transport, wherein at least one first heating section with at least one first heating element as well as at least one second heating section with at least one second heating element is arranged along the transport path, wherein by a first temperature measuring device an actual temperature of the plastic preforms is measured in or before a start region of the transport path, and as a function of this actual temperature of the plastic preforms the at least one first heating element is controlled in such a way that the plastic preforms reach a predetermined target temperature after heating by this at least one first heating element, wherein a material constant of the plastic preforms is determined, wherein in this determination of the material constant, which considers a mass of the plastic preforms, an absorption coefficient of the plastic preforms and a specific thermal capacity of the plastic preforms, is taken into consideration, wherein the material constant is taken into consideration during the heating of the plastic preforms.

2. The method according to claim 1, wherein the plastic preforms are first of all heated by the at least one first heating element and then are heated by the at least one second heating element.

3. The method according to claim 1, wherein the heating elements are arranged stationary and the plastic preforms are transported past these heating elements.

4. The method according to claim 1, wherein by a second temperature measuring device a second actual temperature of the plastic preforms is measured and as a function of this second actual temperature of the plastic preforms the at least one second heating element is controlled.

5. The method according to claim 1, wherein a length of the plastic preforms is determined.

* * * * *